Nov. 21, 1961        C. H. BURNSIDE        3,009,385
METHOD OF LOADING A ROCKET MOTOR WITH SOLID PROPELLANT
Filed Dec. 26, 1957        2 Sheets-Sheet 1

INVENTOR.
C.H. BURNSIDE
BY Hudson & Young
ATTORNEYS

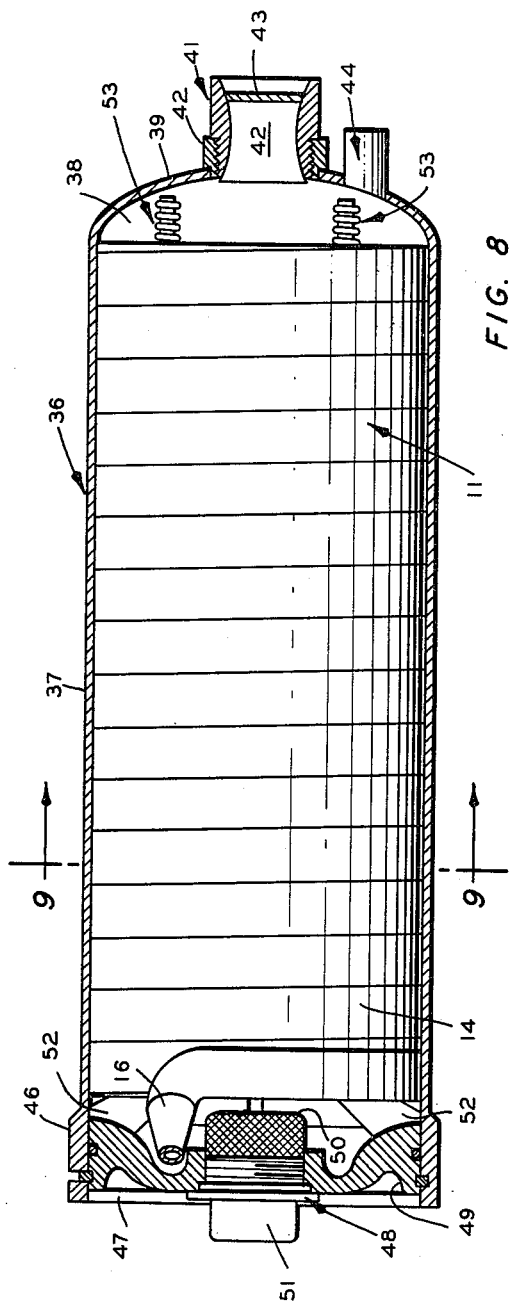
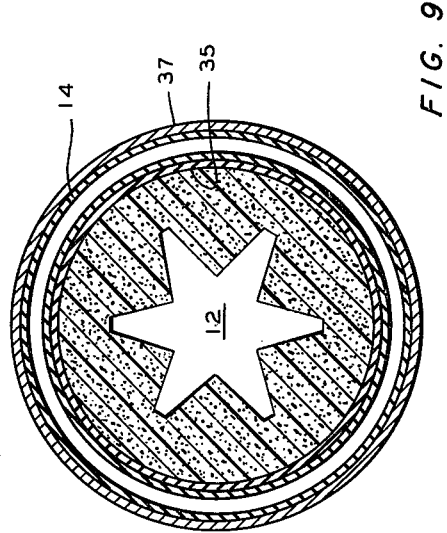

United States Patent Office

3,009,385
Patented Nov. 21, 1961

3,009,385
METHOD OF LOADING A ROCKET MOTOR WITH SOLID PROPELLANT
Charles H. Burnside, Bartlesville, Okla., assignor to Phillips Petroleum Company, a corporation of Delaware
Filed Dec. 26, 1957, Ser. No. 705,463
10 Claims. (Cl. 86—1)

This invention relates to a solid propellant rocket motor charged with a grain of solid propellant supported therein in a novel manner. In a further aspect it relates to a grain of solid rocket propellant and a method for loading the same in the combustion chamber of a rocket motor.

Rocket motors, such as the type with which this invention is concerned, generally comprise a cylindrical casing defining a combustion chamber loaded or charged with a grain of solid rocket propellant which, upon ignition and burning, generates large volumes of gases at high pressures and temperatures. These gaseous products are discharged from the combustion chamber at high velocity through an outlet nozzle located at the rear or aft end of the chamber, thus developing propulsive thrust which propels the rocket motor forward.

Rocket grains of solid propellant can be fabricated by casting or extrusion in cylindrical form. In order to achieve maximum loading of the rocket motor with propellant, the rocket grains are often bonded at their outer cylindrical surface to the inner wall of the rocket motor casing. However, this maximum loading is often achieved at the expense of desirable design parameters.

During storage or transportation of these case-bonded rocket motors, or when they are subjected to temperature-cycling, e.g. between −70° F. and +170° F. according to military specifications, the grains often undergo volume changes due to crystal modifications of propellant constituents or merely due to thermal expansion or contraction, or both, induced by changes in ambient temperature. This is especially true of rocket motors charged with grains of propellant material of the composite type comprising an oxidant and fuel or binder wherein the oxidant is ammonium nitrate due to the fact that ammonium nitrate undergoes crystal modifications when certain changes in temperature occur. These changes in crystal structure often cause a reduction of the strength of the particles and are accompanied by measurable changes in volume. As such, rocket grains made of this type of propellant material often tend to pull away from the rocket motor casing and often cracking or breaking of the grain occurs because of the tensile stresses developed. This cracking tends to undesirably expose certain surfaces of the grain, on which surfaces uncontrolled burning may result with the consequent build-up of pressure within the combustion chamber of the rocket motor at a deleteriously excessive rate. The accelerated and uncontrolled combustion thereby resulting generates gases at an undue pressure build-up for a time shorter than that required for the necessary degree of maximum thrust. In the case of ammonium nitrate, ambient low temperatures may cause a large contraction of the rocket grain.

Rocket motors are often subjected to shocks and vibration during handling as well as during firing or operation. If the grain is not adequately supported in the rocket motor, the grain may tend to become loose and is likely to be subjected to free movement within the rocket motor. If the grain becomes loose, there is a possibility that it will collide with internal rocket motor hardware and become cracked or otherwise broken. Consequently, undesirable surfaces of the grain are exposed, thereby presenting the possibility of uncontrolled burning.

Accordingly, an object of this invention is to provide a novel solid propellant rocket motor. Another object is to provide a method for loading the combustion chamber of a rocket motor with a grain of solid propellant supported in a novel manner within said chamber. Another object is to provide a charged rocket motor characterized by the reduced tendency of its propellant material to crack or break up due to volume changes occasioned by fluctuating ambient temperatures, mechanical shocks, vibrations, and other operating forces. A further object is to provide a charged rocket motor wherein a grain of solid propellant is supported therein in a novel manner so as to insulate the rocket motor casing. Further objects and advantages of this invention will become apparent to those skilled in the art from the following discussion, appended claims and drawing in which:

FIGURE 8 is a side elevational view in partial section of a rocket motor loaded with a grain of solid propellant, such as that shown in FIGURE 1, illustrating aspects of this invention; and FIGURE 9 is an elevational transverse sectional view of FIGURE 8 taken along the plane indicated.

Figure 1:
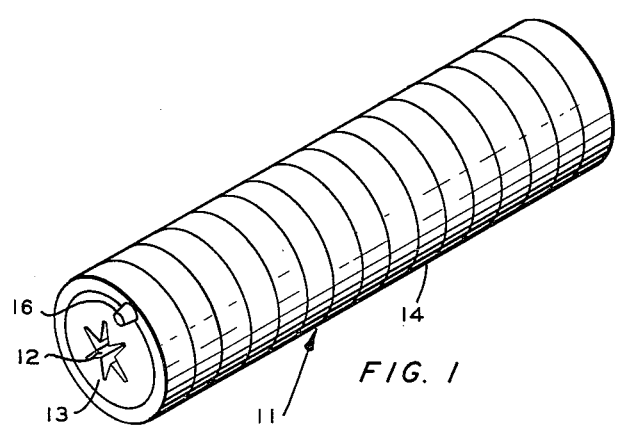
FIGURES 1, 2 and 3 are isometric views of various grains of solid propellant embodying various modifications of this invention.

Referring now to the drawing, wherein like reference numerals refer to like parts, and to FIGURE 1 in particular, a cylindrical grain generally designated 11 is shown. Grain 11 has an axial perforation 12, preferably star-shaped in cross-section, with both ends of said grain adhesively bonded to pieces of burning restricting material 13 made of rubber or the like, these pieces having axial perforations which also are star-shaped in cross section and in alignment with grain perforation 12. The outer cylindrical surface of grain 11 can be similarly adhesively bonded to burning restricting material or can be exposed. Adhesively bonded to the outer cylindrical surface of grain 11 is a single resilient or rubber-like tubing 14. The latter can be wrapped around the outer cylindrical surface of grain 11 in any desirable fashion, such as in the form of a spiral with each turn contacting adjacent turns in the form of a tightly wound wrapping. One end of tubing 14 is closed and the other end is preferably provided with a suitable nozzle or opening 16.

Figure 2:
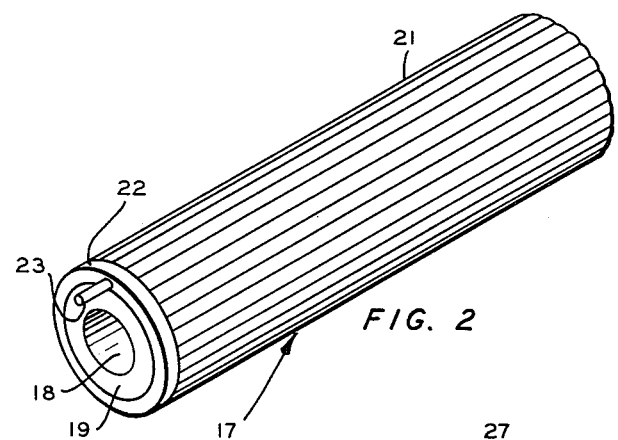

In FIGURE 2 a cylindrical grain of solid propellant generally designated 17 is shown. Grain 17 has an axial perforation 18 which is circular in cross section and the ends 19 of said grain are exposed. The outer cylindrical surface of grain 17 can also be adhesively bonded to burning restricting material. Adhesively bonded to the outer cylindrical surface of grain 17 are a plurality of longitudinally aligned and contiguous resilient or rubbery tubes 21. These tubes 21 have one of their ends closed and the other ends communicating with a common manifold member 22, preferably in annular form and also made of rubber or the like. The outer face of manifold 22 is provided with one or more nozzle-like members 23. In order that the thrust produced by this type of grain remain relatively constant, the length of the grain can be such that the propellant material is burned from both ends at a rate which will compensate the gradually increasing internal burning surface defined by the axial perforation, thereby permitting the total burning surface area to remain relatively constant.

Figure 3:
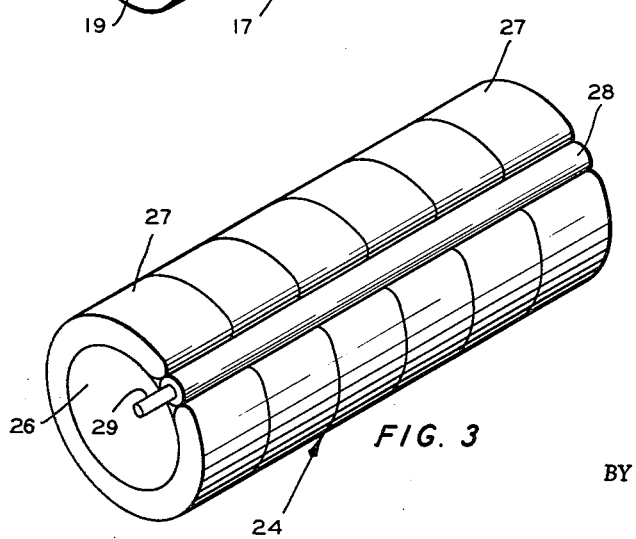
Figure 7:
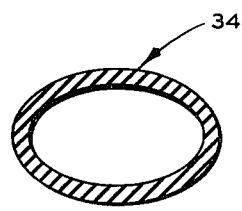

In FIGURE 3 a grain of solid propellant generally designated 24 is shown having one end 26 thereof exposed and the other end thereof preferably adhesively bonded to a disk-like burning restricting member. Alternatively, grain 24 can also be provided with an axial perforation in the shape of a star defining an internal burning surface and both ends of the grain can be covered with burning restricting material. The outer cylindrical surface of grain 24 is adhesively bonded to a plurality of annular rubber-like tubing members 27. Each of the latter communicates with a longitudinally aligned manifold member 28, which is also adhesively bonded to the adjacent portion of the outer cylindrical surface of the grain. Manifold member 28 communicates with each of the annular tubing members 27 and can be provided with suitable valves. One end of manifold member 28 is closed and the other end thereof is preferably provided with a nozzle-like member 29.

Figure 4:
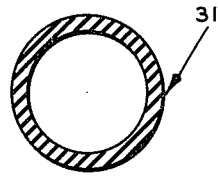
FIGURES 4, 5, 6 and 7 are elevational cross-sectional views of rubber tubing or the like employed in the practice of this invention.
Figure 5:
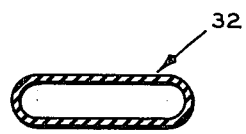

The rubber-like tubing shown in FIGURES 1–3 can be of various shapes, such as those shown in FIGURES 4–7. In FIGURE 4 the rubber tubing 31 is circular in cross-section; the rubber tubing 32 shown in FIGURE 5 is relatively flat; the rubber tubing 33 shown in FIGURE 6 comprises a plurality of tubing members fabricated or molded from the same piece of rubbery material; and in FIGURE 7 the rubber member 34 is elliptical in cross-section. Various other configurations can be utilized in fabricating the rubber tubing members and the foregoing description and illustrated modifications are not meant to limit this invention thereto.

Referring to FIGURES 8 and 9, a rocket motor generally designated 36 is shown and represents one form of jet propulsion device which may be employed, for example, to assist the take-off of aircraft. Rocket motor 36 has an outer cylindrical metal casing 37 which defines a generally cylindrical combustion chamber 38. Casing 37 has a reduced or tapered aft portion 39 provided with an axial opening in which a reaction nozzle generally designated 41 is inserted. Nozzle 41 can be made integral with casing portion 39 or can be made separable as shown and threadedly locked to casing portion 39 by a lock ring 42 or the like. Nozzle 41 is provided with a converging-diverging or De Laval passage 42 across which is provided a thin circular blow-out or starter disk 43 adapted to rupture or burst when a predetermined pressure is reached within combustion chamber 38. The reduced casing portion 39 is preferably provided with a safety plug attachment generally designated 44 which is capable of releasing excessive pressure from the combustion chamber 38 in a manner well known to those skilled in the art. The other or head end of casing 37 can be in the form of an enlarged portion 46 and this end of the casing closed by means of a closure member 47. The latter is provided with an axial opening in which an igniter plug generally designated 48 is inserted, the inner end of the latter being threadedly secured to a grain retaining assembly 49. The inner end of igniter plug 48 is secured to a container 50, preferably in the form of a frangible wire basket or cup, containing suitable ignition material preferably granular or pelleted in form, such as that disclosed and claimed in the copending application, Serial No. 592,995, filed June 21, 1956, by L. G. Herring. The ignition material within container 50 is in contact with suitable electro-responsive means such as squibs or matches which in turn can be readily connected to the electric circuit of an external power source upon removal of a cap 51.

Combustion chamber 38 is loaded with a solid grain of rocket propellant such as grain 11 of FIGURE 1. Grain 11 is preferably inserted within the combustion chamber through the head end thereof prior to placement of the closure member 47, grain retaining assembly 49 and igniter plug 48. Prior to its insertion the inner wall of casing 37 or the outer surface of the rubber tubing 14 is coated with a suitable adhesive. Prior to the insertion of grain 11 in combustion chamber 38 the rubber tubing is in a collapsed condition. After the insertion of grain 11 into its proper position within chamber 38 suitable means are connected to the nozzle 16 of the rubber tubing 14 and an expanding medium, such as air or thermosetting plastic material, is injected into the tubing 14 through nozzle 16 causing the tubing to expand into contact with the inner wall of casing 37. Thereafter, a nozzle member 16 can be removed and this open end of the tubing plugged, or the tubing can be closed in any other suitable manner. Rocket motor 36, with grain 11 loaded therein and the rubber tubing inflated, as described, is then subjected to elevated temperatures so as to cure the bond between the tubing 14 and the inner wall of casing 37 and the bond between the tubing 14 and the outer cylindrical surface of the grain. The propellant material making up the grain can also be concomitantly cured at the same time. Alternatively, the grain can be wrapped with its rubber tubing after the propellant material has been cured. Where the outer cylindrical surface of the grain is first covered with a layer of burning restricting material, this restricting material can be cured prior to the wrapping of the tubing or can be concomitantly cured along with the propellant material and/or the adhesive employed to bond the tubing to the outer cylindrical surface of the grain and the inner wall of casing 37. Either before or after this curing step and after the grain is inserted in the combustion chamber 38 of the rocket motor 37, the head end of the rocket motor can be closed with its closure member, etc. To retain the axial alignment of the grain within the combustion chamber suitable means are employed to this end, such as retaining legs 52 and spring-like prong means 53. After the curing step the tubing 14 remains in its expanded condition. It may be desirable in some instances after the curing step to open the ends of the tubing. Where a gas or liquid is used as the inflating medium, it generally will be desirable to bleed it off after the curing step. Where a solution or thermosetting plastic material is employed to inflate the rubber tubing 14 this material can also be cured to thermoset the same and aid in maintaining the tubing in its expanded condition.

Although the rocket motor 37 is shown loaded with grain 11 of FIGURE 1, it is of course within the scope of this invention to load the rocket motor with the grains of FIGURES 2 and 3, or any other grains fabricated within the scope of this invention. The rubber tubings of these other grains are similarly in a collapsed condition prior to the insertion of these grains into the rocket motor, and the rubber tubings of these grains are similarly expanded so as to achieve the objects of this invention. For purposes of brevity, rocket motors loaded with these other grains have not been illustrated.

Figure 6:
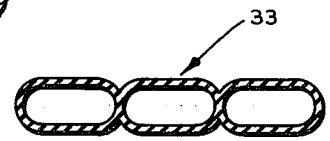

As mentioned hereinbefore the rubber tubular members can be made in various shapes, e.g., flat, round, elliptical, etc. Rubber-like molded tubular items can be employed, such as illustrated in FIGURE 6, the ends of each of the tubes communicating with a common manifold provided with valves or the like. These rubber tubing members may be wrapped around the outer cylindrical surface of the grain in any desirable fashion, e.g., in a helical manner, etc. The size of the rubber tubing can be varied as desired but preferably the diameter of the uninflated tubing will be in the range between 0.1 and 2.0 inches.

The rubber-like tubing members can be fabricated from any material which can be inflated or expanded in accordance with this invention. Suitable materials include natural and synthetic rubbers which can be mixed with various compounding ingredients and cured. The tubular members can be made of the rubbery copolymer of butadiene and styrene, or a rubbery copolymer of butadiene copolymers of isobutylene), hydrogenated rubbers, and silicone rubbers which have good resilience over the temperature ranges normally encountered are also applicable. The particular rubber-like material employed to fabricate these tubular members will be any rubber-like material which will obtain the objects of this invention.

The adhesives employed to bond the rubber tubing members to the grain and to the rocket motor casing are preferably adhesives which will effect a reliable and positive bond, withstand temperatures encountered, and which can be cured within the desired temperature range. These adhesives include cements formulated with epoxy resins. The preferred adhesives or cements should be solvent free and curable at a temperature sufficiently low so as to avoid damage to other components in the rocket motor. Adhesives commonly employed to effect case bonding of propellant grains can be employed.

The inflating or expanding medium employed to inflate or expand the tubular members can be air or other gas, liquids such as water, and plastics and liquid rubbery mixes which are thermosetting in nature. In many cases, and particularly with small diameter motors, e.g., less than 12 inches, air will be sufficient inflating medium. In other cases it may be desirable to use a suitable liquid which can be set to a rubbery or even to a rather rigid mass. With large diameter rocket motors the use of such liquids has the advantage of increasing the support of the grain of propellant in the combustion chamber. However, after such material cures it is sufficiently resilient to withstand the mechanical and thermoshocks encountered. The pressure applied to the inflating material during the curing step should be sufficient to expand the rubber tubing against the propellant and the rocket motor casing; in many cases pressures in the range of about 5 to 100 p.s.i.g. will be adequate.

Suitable liquids which can be employed to expand the rubber tubing are preferably liquids which can be thermoset at temperatures below about 300° F. Particularly useful inflating liquids include: styrene; liquid and polysulfide polymers, such as those known in the trade as LP-2, LP-3, LP-8 and LP-33; liquid epoxy-containing resins such as epoxidized liquid polybutadiene and epoxidized liquid butadiene-styrene copolymers; liquid polybutadiene; liquid polyurethane resins and blends of the like with other resin-forming ingredients; polyamide-epoxy resins; and the like. These inflating materials can be admixed with curatives and fillers as desired; for example, sulfur, sulfur-containing compounds, and peroxides can be used to accelerate the rate of cure.

The propellant material utilized in fabricating the rocket grains of this invention can be prepared from a variety of known compounding materials. The propellants can comprise the ammonium, alkali metal, and alkaline earth metal salts of nitric, perchloric and chloric acids and mixtures thereof. In addition, the propellants can comprise cordite, ballistite, double-base propellants such as a mixture of nitrocellulose and nitroglycerin, various oxidants dispersed in asphalt or polysulfide rubber binders, and the like.

I prefer to employ composite type solid propellant mixtures comprising a major proportion of a solid oxidant such as ammonium nitrate or ammonium perchlorate and a minor proportion of a rubbery binder material such as a copolymer of a conjugated diene and a vinyl-pyridine or other substituted heterocyclic nitrogen base compound. Solid propellant mixtures of this nature and a process for their production are disclosed and claimed in copending application Serial No. 284,447, filed April 25, 1952, by W. B. Reynolds and J. E. Pritchard.

The preferred solid propellant compositions used in this invention can be prepared by mixing the copolymer with a solid oxidant, a burning rate catalyst, and various other compounding ingredients so that the reinforced binder forms a continuous phase and the oxidant a discontinuous phase. The resulting mixture can be heated to effect curing of the same.

The copolymers are preferably formed by copolymerization of a vinyl heterocyclic nitrogen compound with an open chain conjugated diene. The conjugated dienes employed are those containing 4 to 6 carbon atoms per molecule and representatively include 1,3-butadiene; isoprene; 2,3-dimethyl-1,3-butadiene; and the like. The vinyl heterocyclic nitrogen compound generally preferred is a monovinylpyridine or alkyl-substituted monovinyl-pyridine such as 2-vinylpyridine, 3-vinylpyridine, 4-vinyl-pyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed is in the range between 75 and 95 parts by weight per 100 parts monomers and the vinyl heterocyclic nitrogen compound is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The prefered, readily available binder employed is a copolymer prepared from a monomer mixture comprising 90 parts by weight of butadiene and 10 parts by weight of 2-methyl-5-vinylpyridine, hereinafter abbreviated Bd/MVP. This monomer mixture is polymerized under suitable conditions to form a polymer having a Mooney (ML-4) plasticity value in the range of 10-40, preferably in the range of 15 to 25. This copolymer may be masterbatched with 5-20 parts of Philblack A, a furnace black, per 100 parts of rubber. Masterbatching refers to the method of adding carbon black to the latex before coagulation; upon addition of suitable coagulants, the polymer is coagulated and contains carbon black in the rubber. In order to facilitate dispersion of the carbon black in the latex, Marasperse-CB, or similar surface active agent, is added to the carbon black slurry or to the water used to prepare the slurry.

The following formulation generally represents the class of propellant composition preferred for the preparation of the propellant grains of this invention.

TABLE I

Propellant:
Oxidant (ammonium
nitrate) _____ 90-75 weight percent.
Binder_____ 10-25 weight percent.
Burning rate catalyst_____ 0-30 parts/100 parts oxidant-binder.

Suitable plasticizers useful in preparing these propellant grains include TP-90-B (dibutoxyethoxyethyl formal) supplied by Thiokol Corporation; benzophenone; and Pentaryl A (monobiphenyl). Suitable silica preparations include a 10-20 micron size range supplied by Davison Chemical Co.; and Hi-Sil 202, a rubber grade material supplied by Columbia-Southern Chemical Corp. A suitable antioxidant is Flexamine, a physical mixture containing 65 percent of a complex diarylamine-ketone reaction product and 35 percent of N,N'-diphenyl-p-phenylenediamine, supplied by Naugatuck Chemical Corp. A suitable wetting agent is Aerosol-OT (dioctyl sodium sulfosuccinate), supplied by American Cyanamide Co. Satisfactory rubber cure accelerators include Philcure 113 (N,N-dimethyl-S-tertiary butylsulfenyl dithiocarbamate), supplied by Phillips Petroleum Co.; Butyl-8 (a dithiocarbamate-type rubber accelerator) supplied by R. T. Vanderbilt Co.; and GMF (quinone dioxime), supplied by Naugatuck Chemical Company. Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, fox-glove blue, Hamberg blue, laundry blue, washing blue, Williamson blue, and the like. Other burning rate catalysts such as ammonium dichromate, potassium dichromate, sodium dichromate, ammonium molybdate, and the like can also be used.

The layer of restricting material can be made from any of the slow-burning materials used for this purpose for the rocket art, such as cellulose acetate, ethylcellulose, GRS, and preferably a butadiene-methylvinylpyridine copolymer. It should be understood that metal plates or the like can be used to restrict the ends of the grains, and the rubber-like tubing of this invention serve to restrict the outer cylindrical surfaces of the grains without the necessity of using other restricting material.

In the operation of the rocket motor illustrated in FIGURES 8 and 9, igniter 48 is armed by removal of cap 51 and the connection of the electrical lead lines to the electro-responsive means embedded in the ignited material filling container 50. Upon closing a suitable switch in the electrical lead lines, igniter 48 is fired causing the ignition material within container 50 to ignite and burn. The resulting hot ignition products rupture or otherwise break the container 50 and fill the combustion chamber, these products preferably propagating down through the axial perforation in the grain 11, transferring heat to the exposed burning surfaces causing the same to attain an ignition temperature. The propellant material making up the grain then burns in relatively parallel layers generating large volumes of combustion gases. When the pressure within the combustion chamber 38 reaches a predetermined pressure, e.g., 250–300 p.s.i., the starter disk 43 functions by rupturing or bursting and then combustion gases escape through nozzle passage 42 at a high velocity, thereby imparting thrust to the rocket motor.

The following examples illustrate the advantages obtained by the practice of this invention and it is to be understood that they do not limit the same.

*Example I*

A propellant composition comprising ammonium nitrate as an oxidant and a rubbery copolymer as the binder was prepared and the resulting mixture extruded in the form of a cylindrical grain of propellant having an external diameter of 3 inches with an axial perforation, circular in cross-section, having an internal diameter of 1.5 inches. The binder was prepared from the recipe set forth in Table II.

TABLE II

Parts per 100 parts rubber

| | |
|---|---|
| 90/10 1,3 - butadiene/2-methyl-5-vinylpyridine copolymer | 100 |
| Carbon black (Philblack A) | 22 |
| Flexamine[a] | 3 |
| ZP-211[b] | 20 |

[a] 65% diaryl amine-ketone reaction product and 35% N,N'-diphenyl-p-phenylenediamine antioxidant.
[b] Crude di (1,4,7-trioxaundecyl)methane which has been stripped of light material.

The above-described binder composition was mechanically mixed with oxidant, burning rate catalyst and a smoke depressant according to the following recipe:

TABLE III

| | Parts by weight |
|---|---|
| Binder | 16.5 |
| Ammonium nitrate | 83.5 |
| Milori blue | 2.0 |
| Magnesium oxide | 0.5 |

The above propellant ingredients were blended in a 2¼ gallon Baker-Perkins mixer. As soon as all the ingredients were incorporated in the rubbery binder the ram of the mixer was lowered in place and the mixing or blending was continued for a 15-minute period in order to achieve a uniform dispersion. The ram was then removed and the mixture was milled for an additional 10-minute period at reduced pressure (about 1 inch mercury absolute) to remove residual moisture and other volatile material. The propellant composition was subsequently extruded using a ram-type hydraulic extruder. The extruder was equipped with a tubular die having an outside diameter of 3 inches and an inside diameter of 1.5 inches. A pressure of 4000 p.s.i. was applied to the propellant composition during extrusion. To minimize inclusion of air in the extruded propellant a vacuum was pulled on the nozzle of the extruder until the propellant composition was forced through the nozzle.

A rubber restrictor sheet having a thickness of 0.01 inch was cemented to the external cylindrical surface of the extruded grain using EC–1300, a commercial rubber cement. This restrictor sheet was butt-jointed on the surface of the grain. The restricting grain was then cured at 190° F. for 24 hours.

A single rubber tubing of the Gooch type having a circular diameter of 0.5 inch and a flat diameter of 1 inch was cleaned with dilute solutions of hydrochloric acid, sodium hydroxide and water to remove soaps, talc and other materials on the surface. The external surface of the tubing was then rubbed with an abrasive to effect further cleaning and to give a rough surface. The tubing was then coated with Gaco N–700, a neoprene rubber cement, and the tubing was then wrapped around the outer cylindrical surface of the grain so that butted joints were formed. The wrapped grain was then inserted in the combustion chamber of a rocket motor.

The rocket motor had a steel casing and an internal diameter of 3.3 inches and was 3.3 inches in length, the casing having been previously cleaned and dried. Prior to the insertion of the grain, the interior of the casing was coated with Cordolite 7019, a commercial epoxy resin. The wrapped grain was then inserted into the combustion chamber of the rocket motor. One end of the tubing was sealed with a clamp and the tubing was then expanded with air at about 20 p.s.i. to come in contact with the inner wall of the casing. The loaded rocket motor was then cured for one hour at 190° F. so as to cure the bond between tubing and casing and between the tubing and the outer surface of the restricted grain. After curing, the ends of the grain were sawed flush with the ends of the rocket motor casing. Two longitudinally extending and oppositely disposed slots were cut on the internal burning surface of the grain so as to provide points at which failure of the propellant material may occur.

The loaded rocket motor was then fired in an interrupted burner at 600 p.s.i. for 0.8 second. The interrupted burner was a device which permitted mounting of the casing with means to effect a rapid decrease in pressure after firing of the rocket motor. The decrease in pressure effected a rapid termination of the burning of the propellant, this decrease in pressure being accomplished by the firing of a shotgun shell which ruptures a disk in the end of the combustion chamber thereby permitting the rapid reduction in combustion chamber pressure. After firing, the rocket motor casing was then opened and the grain examined. No failures were observed as evidenced by the lack of cracks or fissures between casing and the rubber tubing or between the rubber tubing and the restricted grain. The propellant had burned uniformly and there appeared to be no cracks within the body of the propellant.

*Example II*

The grain of solid rocket propellant was prepared as stated in Example I, employing the same type of rubbery tubing and bonding procedure with the exception that the rubber tubing was expanded with a plastic fluid rather than air. This plastic fluid has the composition set forth in Table IV.

TABLE IV

| | Parts by weight |
|---|---|
| Castor oil | grams 32 |
| Epon 562 [1] | do 10 |
| Tolylene diisocyanate | do 11 |

[1] Liquid polyurethane resin.

After filling the rubber tubing with the plastic material, the assembly was cured for one hour at 190° F. and then at room temperature (about 75° F.) for 18 hours. During the curing period no pressure was applied to the plastic fluid. As in Example I, the grain was sawed flush with the ends of the rocket motor casing, the latter having a length of 3.9 inches. Slots were cut in the grain as previously described in Example I. The plastic had cured to a soft rubber. The assembly was then fired in an interrupted burner for two seconds in the manner described in Example I. After firing, the propellant grain was examined and inspection revealed no evidence of failure of the bond between the tubing and casing and the bond between the tubing and restricted grain. The propellant material of this grain after firing similarly exhibited no cracks or other imperfections.

Various modifications and alterations of my invention will become apparent to those skilled in the art without departing from the scope and spirit of my invention, and it is to be understood that the foregoing discussion and accompanying drawing merely represent preferred embodiments of my invention and do not unduly limit the same.

I claim:

1. A method of loading the combustion chamber of a rocket motor defining the same, which method comprises coating a grain of solid rocket propellant with an adhesive, affixing collapsed tubular means to said grain, coating at least one of the outer surface of said tubular means and the inner wall of said combustion chamber with an adhesive, inserting said grain with said affixed tubular means in said chamber, inflating said tubular means into contact with the inner wall of said motor by injecting an expanding medium into the end of said tubular means, and subjecting the resulting assembly to elevated curing temperatures to maintain said tubular means in an expanded condition.

2. A method of loading the combustion chamber of a rocket motor having a metal casing defining said chamber, which method comprises coating the outer cylindrical surface of a cylindrical grain of said propellant with an adhesive, affixing collapsed tubular means to said cylindrical surface, coating the outer surface of said tubular means with adhesive, inserting said grain with said affixed tubular means in said chamber, injecting an expanding medium into one end of said tubular means to expand the same into contact with the inner wall of said casing, and subjecting the resulting assembly to elevated curing temperatures to cure the bonds between said tubular means, said grain and said inner wall of said casing to maintain said tubular means in an expanded condition.

3. The method according to claim 2 wherein said tubular means comprises a rubber tubing wound about the outer cylindrical surface of said grain.

4. The method according to claim 2 wherein said tubular means comprises a plurality of circumferentially contiguous rubber tubes oriented in a longitudinal direction, those ends of said tubes adjacent one end of said grain being closed and the opposite ends of said tubes communicating with an annular rubber-like manifold at the other end of said grain.

5. The method according to claim 2 wherein said tubular means comprises a plurality of annular rubber tubes the ends of which communicate with a rubber manifold longitudinally oriented with respect to said grain.

6. The method according to claim 2 wherein said expanding medium is air.

7. The method according to claim 2 wherein said expanding medium is a thermosetting plastic.

8. A method of loading a rocket motor with a grain of solid propellant, said rocket motor having a metal casing defining a cylindrical combustion chamber and a reaction nozzle secured to the aft end of said casing, said grain having a generally cylindrical shape with an axial perforation defining an exposed burning surface, said grain having its outer cylindrical surface covered with burning restricting material, which method comprises coating the outer cylindrical surface of said restricted material with an adhesive, winding a collapsed rubber tubing around the resulting coated surface, one end of said tubing being closed and the other end thereof being fitted with a nozzle, coating the outer surface of said rubber tubing with an adhesive, inserting said grain with said tubing wound thereabout into said chamber of said rocket motor, injecting an expanding medium into said rubber tubing through its nozzle to expand said tubing into contact with the inner wall of said casing, and subjecting the resulting assembly to elevated curing temperatures to cure said coatings of adhesive, thereby maintaining said rubber tubing in its expanded condition.

9. The method according to claim 8 wherein said expanding medium is air.

10. The method according to claim 8 wherein said expanding medium is a thermosetting plastic which also cures under said elevated temperatures.

References Cited in the file of this patent

UNITED STATES PATENTS

| | | |
|---|---|---|
| 2,479,470 | Carr | Aug. 16, 1949 |
| 2,695,255 | Avery | Nov. 23, 1954 |
| 2,751,810 | Clark et al. | June 26, 1956 |
| 2,784,638 | Diels et al. | Mar. 12, 1957 |
| 2,814,179 | Edelman et al. | Nov. 26, 1957 |
| 2,816,418 | Loedding | Dec. 17, 1957 |
| 2,877,504 | Fox | Mar. 17, 1959 |